C. A. LINDSTROM.
FRICTION LOCKING DEVICE.
APPLICATION FILED MAR. 6, 1913.
1,153,556.
Patented Sept. 14, 1915.
3 SHEETS—SHEET 3.
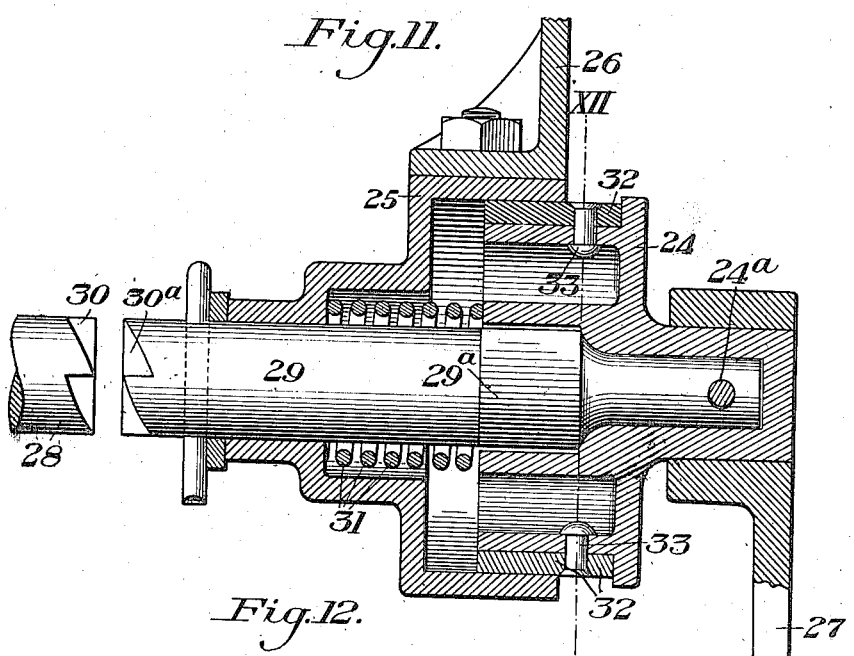
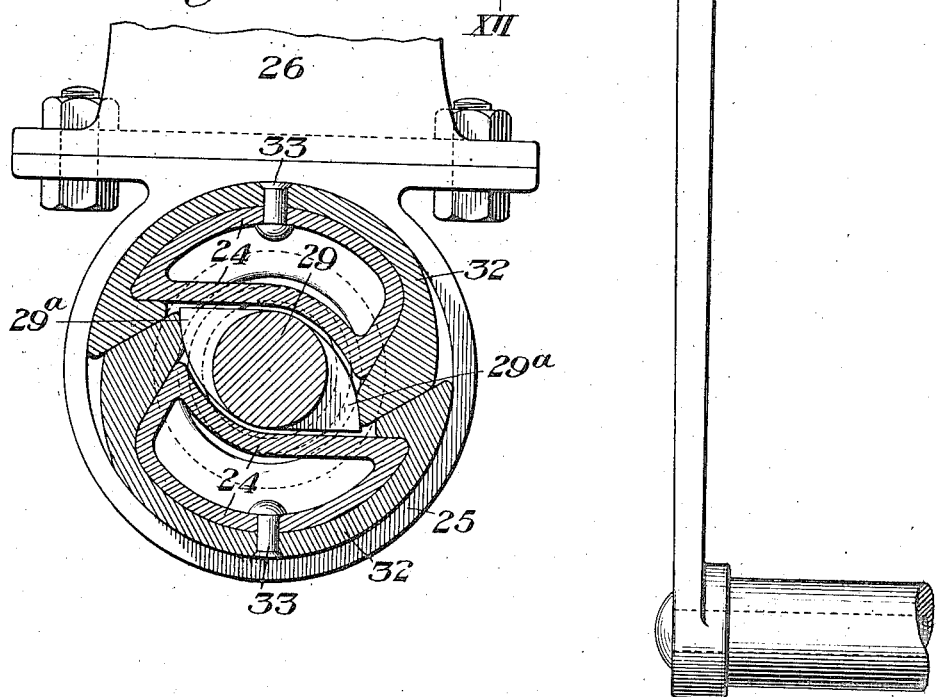
WITNESSES
INVENTOR

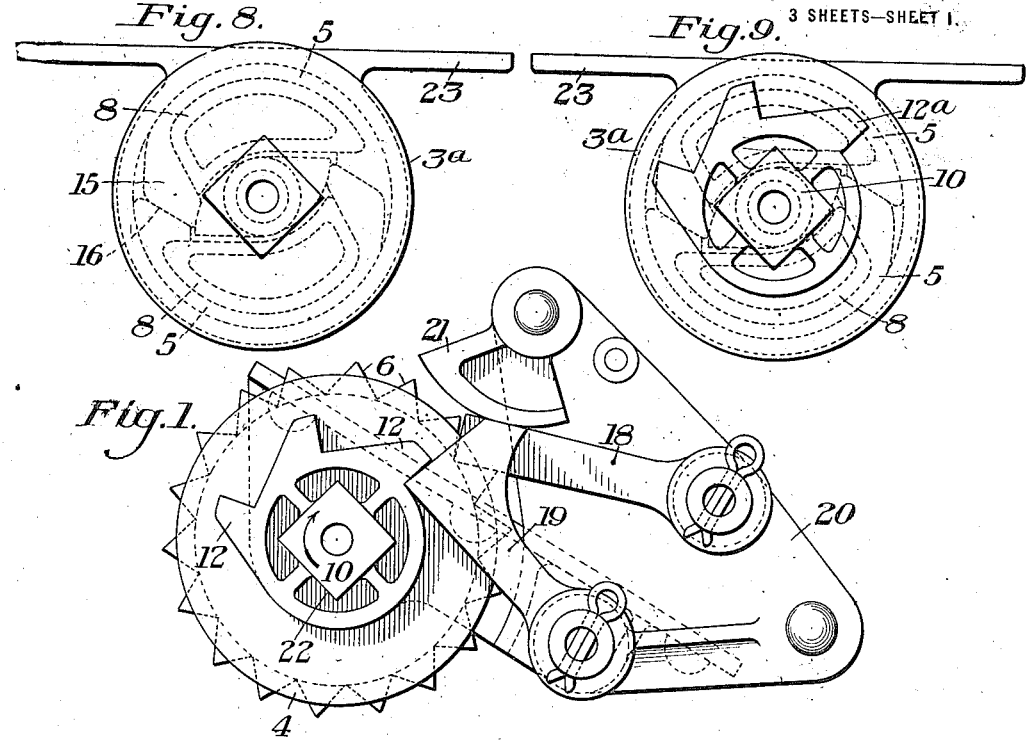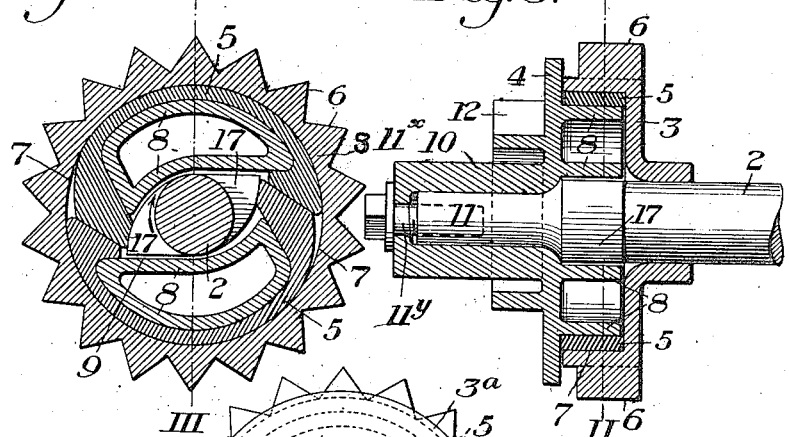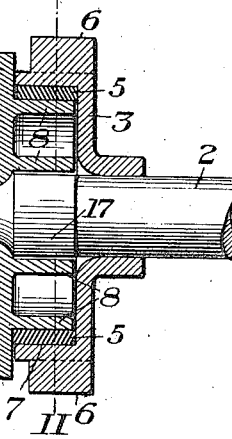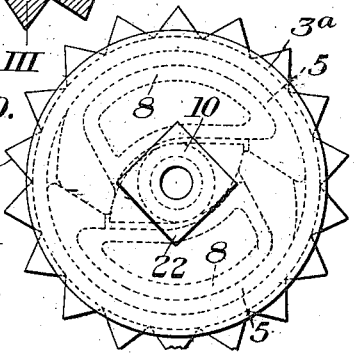

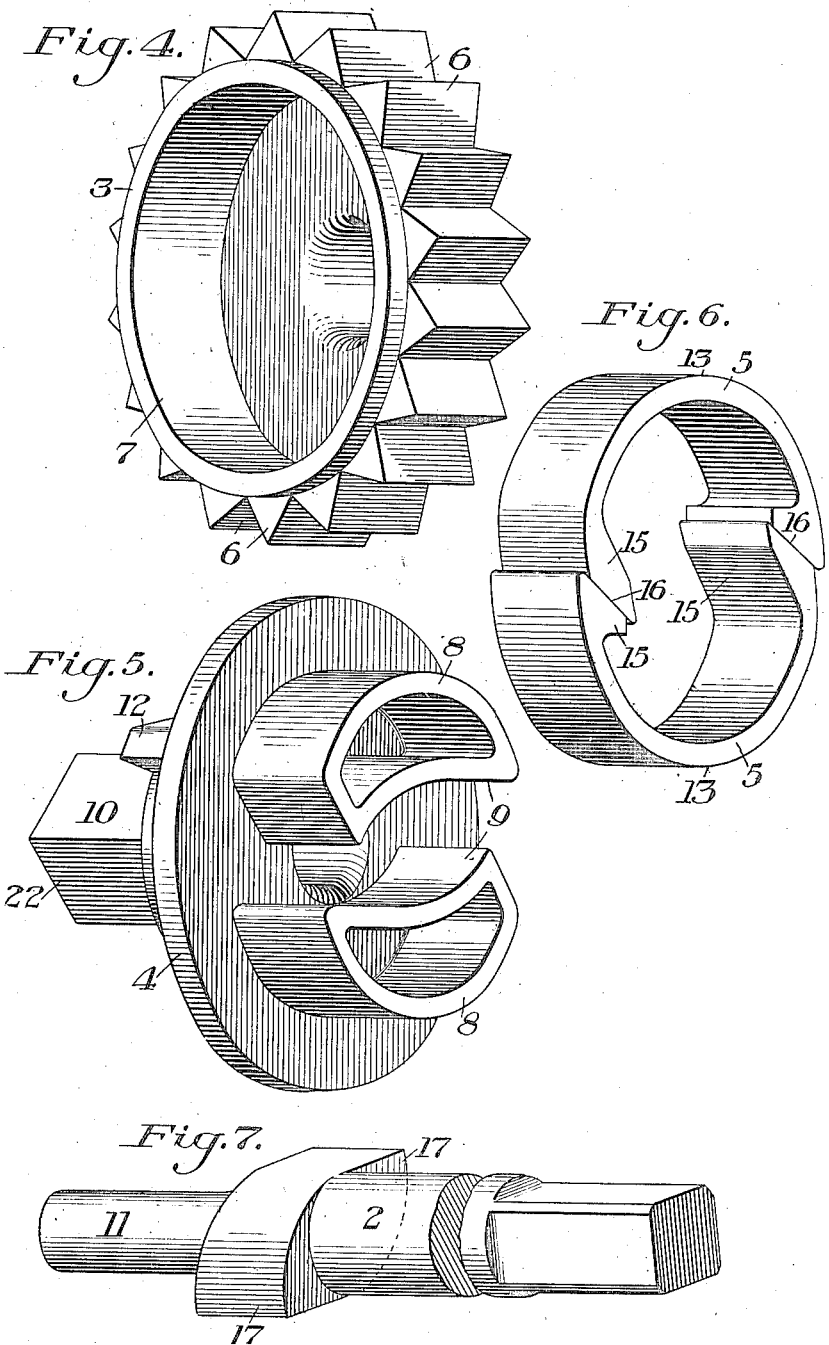

UNITED STATES PATENT OFFICE.

CHARLES A. LINDSTROM, OF PITTSBURGH, PENNSYLVANIA.

FRICTION LOCKING DEVICE.

1,153,556.    Specification of Letters Patent.    Patented Sept. 14, 1915.

Application filed March 6, 1913. Serial No. 752,529.

*To all whom it may concern:*

Be it known that I, CHARLES A. LINDSTROM, a citizen of the United States, residing at Pittsburgh, in the county of Allegheny and State of Pennsylvania, have invented a new and useful Improvement in Friction Locking Devices, of which the following is a full, clear, and exact description, reference being had to the accompanying drawings, forming part of this specification, in which—

Figure 1 is a side view of one form of device embodying my invention; Fig. 2 is a sectional view of the same taken on the line II—II of Fig. 3; Fig. 3 is a section on the line III—III of Fig. 2; Figs. 4, 5, 6 and 7 are perspective views of the several parts of the device; Figs. 8, 9 and 10 are side views, illustrating three different modifications; Fig. 11 is a longitudinal section showing another modification; and Fig. 12 is a section on the line XII—XII of Fig. 11.

My invention has relation to friction-locking devices, particularly designed for use where it is desired to positively hold a shaft or other member against rotation by the action of a load or resistance acting upon such shaft or member in one direction only. The device is capable of various uses, as in connection with car-door-operating gear, cranking mechanism for automobiles, etc.

The object of my invention is to provide a simple and efficient device of this character which may be used to permit a slow turning movement only of the shaft or member to be locked, or which may be used to permit either a slow or a quick releasing movement of said member.

The nature of my invention will be best understood by reference to the accompanying drawings, in which I have shown the preferred embodiments thereof and which will now be described, it being premised, however, that various changes can be made in the details of construction and arrangement of the several parts, without departing from the spirit and scope of my invention as defined in the appended claims.

Referring first to that form of my invention which is shown in Figs. 1 to 7, inclusive, the numeral 2 designates the shaft or other rotary member to be locked, and 3 what I term the "external member" of the device; 4 the internal member, and 5 the interposed friction members. The external member 3 in the form shown in these figures is of circular form, having peripheral ratchet teeth 6 and an internal cylindrical friction surface 7. The internal member consists of a disk portion having two segmental projections 8, which extend within the external member, the outer surfaces of these projections being concentric with the friction surface 7, and their inner faces 9 being of irregular curved form. Said internal member also has a sleeve or hub portion 10, which fits loosely on the cylindrical end portion 11 of the shaft 2. It is also shown in these figures as having the series of external ratchet teeth or projections 12. The friction members 5 consist of two similar segments having external friction surfaces 13, adapted for frictional engagement with the surface 7 and being interposed between the said friction surface and the segmental projections 8. The ends of the members 5 are formed with projections 15 having the contacting beveled surfaces 16. The friction members occupy the spaces between the exterior of the segmental projections 8 and the interior frictional surface of the member 3, the projections 15 fitting the ends of the projections 8 and extending inwardly between said projections. One projection 15 of each member 5 is adapted for engagement with the curved surface of a cam projection 17 on the member 2. Said member has two of these cam projections 17, arranged oppositely to each other, one of them engaging one projection 15 of one member 5, and the other one engaging the said projection 15 of the other member 5. Both members 3 and 4 are loosely mounted on the shaft 2. The numeral 18 designates a pivoted pawl adapted for engagement with the ratchet teeth 6 of the member 3; and 19 is another pawl adapted for engagement with the ratchet teeth or projections 12 of the member 4. These pawls are pivoted to any suitable fixed support 20. 21 is a pivoted dog, adapted to engage both pawls 18 and 19, and secure them in holding positions. The end portion of the sleeve part of the member 4 is squared, as indicated at 22, to receive the socket of a suitable operating wrench or lever.

In operation, the load on the member 2 is at all times tending to rotate said shaft in the direction of the arrow (Figs. 1 and 2). This causes the cam projections 17 to act upon the projections 15 of the friction members with which they engage, thereby forcing said friction members into frictional contact with the friction surface 7 of the external member 3. This binding is due to the fact that as the cam projections 17 act upon the ends of the friction members, the latter are expanded thereby increasing the diameter of their peripheral circle. The latter being locked by the pawl 18, it is obvious that the shaft 2 is securely held against movement. The pawl 19 forms a further safeguard, since it holds the internal member 4 against any movement in the direction of the arrows. This pawl 19 may, however, be omitted, as will appear from the description of some of the modifications. Any suitable means, such as the flanged nut or head 11$^x$ on the pin 11$^y$, secured in the end of the portion 11 of the shaft 2 may be employed to prevent endwise movement of the internal member relatively to the external member. When it is desired to give a quick release to the member 2, both pawls 18 and 19 are disengaged from their respective ratchets; thereby permitting all the parts to turn with the member 2. If the shaft 2 contains a crank, or is connected to any other member which requires to be moved off center before the shaft is released, as is usual in car-door-operating mechanism, this can be effected by applying a wrench or operating lever to the square end of the sleeve portion of the internal member. If it is desired to effect a slow release of the shaft 2, this can be done by using the said lever or wrench to slowly rotate the member 4 (the pawl 19 being thrown out of engagement, but the pawl 18 remaining in locking engagement with the ratchet teeth of the external member). When the internal member is rotated in this manner, the segmental projections 8 will carry the friction members 5 with them, so that they will rotate without much friction-holding engagement with the surface 7. The shaft 2 will be unable to turn faster than is permitted by this movement of the internal member, since it is exerting a constant tendency against the friction members to force them into frictional engagement with the friction surface of the external members.

The device as thus described is of special utility in connection with car-door-operating mechanism, since it permits a quick release of such mechanism and of the door to permit a quick discharge of the car contents in ordinary unloading operations. If a slow opening movement of the door is desired, as in ballasting operations, this can be readily effected in the manner described. In operating the device to close car doors, the wrench or lever is applied to the square portion of the internal member and the latter is rotated. When rotated in this direction, all the parts will rotate together as a unit, the segmental projections contacting with the cam projections on the shaft 2 to rotate the latter in a backward direction.

In the modification illustrated in Fig. 8, the external member 3$^a$ instead of being rotatable and normally held against rotation by a pawl, is fixedly secured to or forms a fixed part of an attaching bracket 23. In this form, the ratchet projections on the internal member are also omitted. The parts are otherwise the same as in the form first described. This form of my invention is adapted for use when it is desired that the shaft 2 shall only be rotatable by means of a wrench or crank and not by any power which may tend to turn the shaft from the other end, as for instance, the back action in cranking automobiles.

The modification shown in Fig. 9 is similar to that shown in Fig. 8, except that the internal member is provided with ratchet teeth or projections 12$^a$, as in the form first described, which are adapted to be engaged by a movable pawl (not shown).

The form shown in Fig. 10 is like that shown in Fig. 1, except that the ratchet teeth or projections of the internal member are omitted.

Figs. 11 and 12 show another form of my invention which is particularly applicable as a cranking device for automobiles. In this form, the internal member 24 is movable longitudinally within the external member 25, which is fixed to a suitable support 26. 27 designates the usual crank, secured to the hub of the member 24 at 24$^a$. 28 is the engine shaft, and 29 is the shaft member of the friction device and which is fastened to the member 24 at 24$^a$. It is also connected to the shaft 28 through suitable clutch members 30 and 30$^a$. 31 is a compression spring interposed between the two members 24 and 25, said spring also bearing against the cam projections 29$^a$ on the shaft member 29. 32 designates the friction segments, which may be secured to the segmental projections of the member 24 to move longitudinally therewith, as indicated at 33. In cranking, the member 24 is pushed inwardly against the action of the spring 31, to cause the shaft member 29 to clutch the engine shaft 28. The crank is then rotated, the member 24 and the segments 32 rotating as a unit within the member 25. As soon as the engine starts in the right direction, the clutch member 30 runs ahead of the clutch member 30$^a$, and the two members are at once separated. If the engine "back-fires," the shaft member 29 is thereby turned in the reverse direction, bringing the segments 32 into action, as in the forms first described. That is to say, the slightest backward movement of the shaft member 29 causes the cam members 29$^a$ to expand the segments 32. (It will be noted, however, by comparing Figs. 2 and 12, that the parts in Fig. 12 are arranged to lock in the reverse direction to the locking action in Fig. 2.) This checks the back throw of the crank and prevents injury to the operator therefrom.

The advantages of my invention will be apparent, since it provides a very simple and extremely efficient form of friction-locking device adapted to a variety of uses, and which can be used to give either a quick or a slow release.

The specific form of my invention shown in Figs. 11 and 2 forms the subject matter of a divisional application Serial No. 789,995, filed September 16, 1913.

I claim:

1. A friction locking device, comprising a rotatable member to be locked, having cam projections, an external member having an internal friction surface, an internal member having segmental projections, and expansible friction members seated between the segmental projections and the said friction surface, and each of said friction members having a lever-forming end portion extending beyond one of the segmental projections and engaged by one of said cam projections, substantially as described.

2. A friction locking device, comprising a rotatable member to be locked, having cam projections, an external member having an internal friction surface, an internal member having segmental projections, expansible friction members seated between the segmental projections and the said friction surface, each of said friction members having a lever-forming end portion extending beyond one of the segmental projections and engaged by one of said cam projections, and also being abutted against the adjacent end of the other projection, substantially as described.

3. The combination of a member to be held against rotation in one direction, an external member having a friction surface, elastic segmental friction elements which coact with said surface and having abutted end portions with beveled engaging surfaces, and engaged with the member to be locked by means of projections which act upon the ends of the friction members, an internal member engaged with the friction elements to effect a relatively free rotation thereof, and means whereby the external member may be held either against rotation or may be permitted to rotate with the member to be locked, substantially as described.

4. The combination of a member to be locked against rotation in one direction and which has cam projections, an external member within which the first named member may rotate and which has a friction surface, means whereby the external member may be held against rotation or may be permitted to rotate, an internal member, expansible friction elements between the two members having abutted end portions whereby the said friction members interact one upon the other and engaged with the said cam projections, and also with the internal member, and means whereby the internal member may be rotated within the external member, substantially as described.

5. The combination of a member to be locked against rotation in one direction and which has cam projections, an external member within which the first named member may rotate and which has a friction surface, means whereby the external member may be either held against rotation or may be permitted to rotate, an internal member, friction elements between the two members, said elements having abutted end portions with wedging contacting surfaces and engaged at their end portions with the said cam projections and also with the internal member, and means whereby the internal member may be rotated within the external member, together with locking means for the internal member, substantially as described.

6. The combination of a member to be locked against rotation in one direction, and which has two opposite cam projections, an external member having an internal friction surface, an internal member which has segmental projections rigid therewith and adapted to engage the said cam projections, segmental expansible friction elements interposed between said friction surface and the said segmental projections and rotatably engaged by the segmental projections and also engaged by said cam projections, and means whereby the internal member may be rotated relatively to the external member and with the member to be locked, substantially as described.

7. The combination of a member to be locked against rotation in one direction, and which has two opposite cam projections, an external member having an internal friction surface, an internal member which has segmental projections adapted to engage the said cam projections, expansible segmental friction elements interposed between said friction surface and the said segmental projections and rotatably engaged by the segmental projections and also engaged at their end portions by the said cam projections, and means whereby the internal member may be rotated relatively to the external member and with the member to be locked, together with a locking pawl for the external member, substantially as described.

8. The combination of a member to be locked against rotation in one direction, and which has two opposite cam projections, an external member having an internal friction surface, an internal member which has segmental projections adapted to engage the said cam projections, expansible segmental friction elements interposed between said friction surface and the said segmental projections, and rotatably engaged by the segmental projections, the friction elements having abutted ends with wedging contacting surfaces, said ends being engaged by the cam projections in one direction of rotation of the latter, and means whereby the internal member may be rotated relatively to the external member and with the member to be locked, together with separate locking pawls for the external and internal members, substantially as described.

9. In a device of the character described, the combination of an external member having a circular internal friction surface, an internal member having portions within the external member, a shaft around which the said members are concentrically mounted, two expansible segmental friction elements seated between the internal and external members and rotatably engaged with the said portions, the said elements having abutting end portions formed with beveled contacting surfaces, and the shaft having means which engage the internal member in one direction of movement and one end portion of each friction element in the opposite direction of movement, substantially as described.

In testimony whereof, I have hereunto set my hand.

CHARLES A. LINDSTROM.

Witnesses:
GEO. H. PARMELEE,
H. M. CORWIN.